United States Patent [19]

Kannapell et al.

[11] Patent Number: 4,702,145
[45] Date of Patent: Oct. 27, 1987

[54] STORES MAGAZINE AND LAUNCH SYSTEM

[75] Inventors: John T. Kannapell, Hermosa Beach; Haig Asdurian, Fullerton; Robert F. Buttles, Torrance, all of Calif.

[73] Assignee: Northrop Corporation, Hawthorne, Calif.

[21] Appl. No.: 875,422

[22] Filed: Jun. 17, 1986

[51] Int. Cl.⁴ .......................... F41F 3/06; B64D 1/02
[52] U.S. Cl. .................. 89/1.803; 89/1.801; 89/1.805; 244/137.4
[58] Field of Search .................. 244/137 R, 137 A; 89/1.801, 1.802, 1.803, 1.804, 1.805, 1.815, 1.57

[56] References Cited

U.S. PATENT DOCUMENTS

| | | | |
|---|---|---|---|
| 2,450,951 | 10/1948 | Goodhue et al. | 89/1.803 |
| 2,459,314 | 1/1949 | Goodhue | 89/1.803 |
| 2,464,920 | 3/1949 | Carter | 89/1.803 |
| 2,630,740 | 3/1953 | Robert et al. | 89/1.803 |
| 2,803,168 | 8/1957 | Robert et al. | 89/1.803 |
| 2,826,120 | 3/1958 | Lang et al. | 89/1.803 |
| 2,915,945 | 12/1959 | Linke et al. | 89/1.803 |
| 3,871,604 | 3/1975 | Coutin | 244/137 A |
| 4,333,384 | 6/1982 | Arnold | 244/137 A X |
| 4,399,968 | 8/1983 | Stock et al. | 244/137 A |
| 4,608,907 | 9/1986 | Ellis et al. | 89/1.815 |

Primary Examiner—David H. Brown
Attorney, Agent, or Firm—Terry J. Anderson; Robert B. Block

[57] ABSTRACT

A stores handling system for an aircraft having a fuselage including a chamber for enclosing the stores handling system proximate an area openable through said fuselage through which stores may be loaded into and ejected from the aircraft. The handling system comprises a magazine arranged substantially vertically within the chamber for storing and positioning ejectable stores and including a flexible drive having stores holding shoes spaced apart thereon for engaging and retaining stores against movement within the aircraft, and for lifting and/or lowering stores within the magazine; and a launching mechanism for receiving stores individually from said magazine drive, and including an actuator having hands pivotable between a first closed position and a second open position for engaging the lowermost store to preclude ejecting movement when said hands are in said first position, and for engaging said stores to eject same from the aircraft when said hands are in said second position.

24 Claims, 18 Drawing Figures

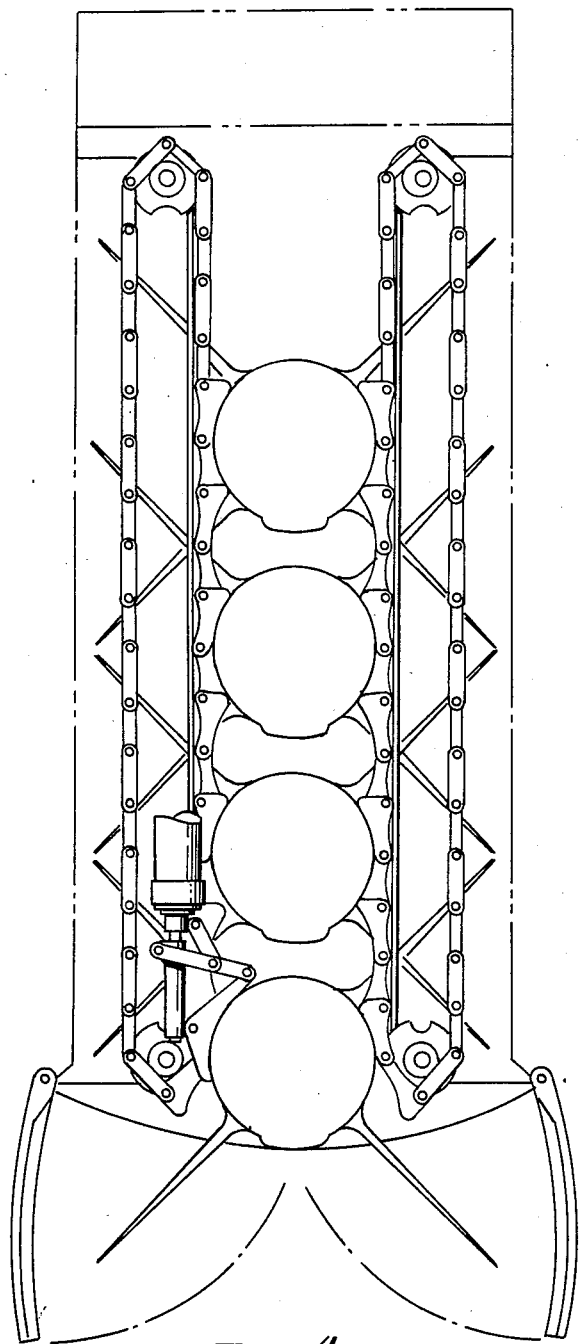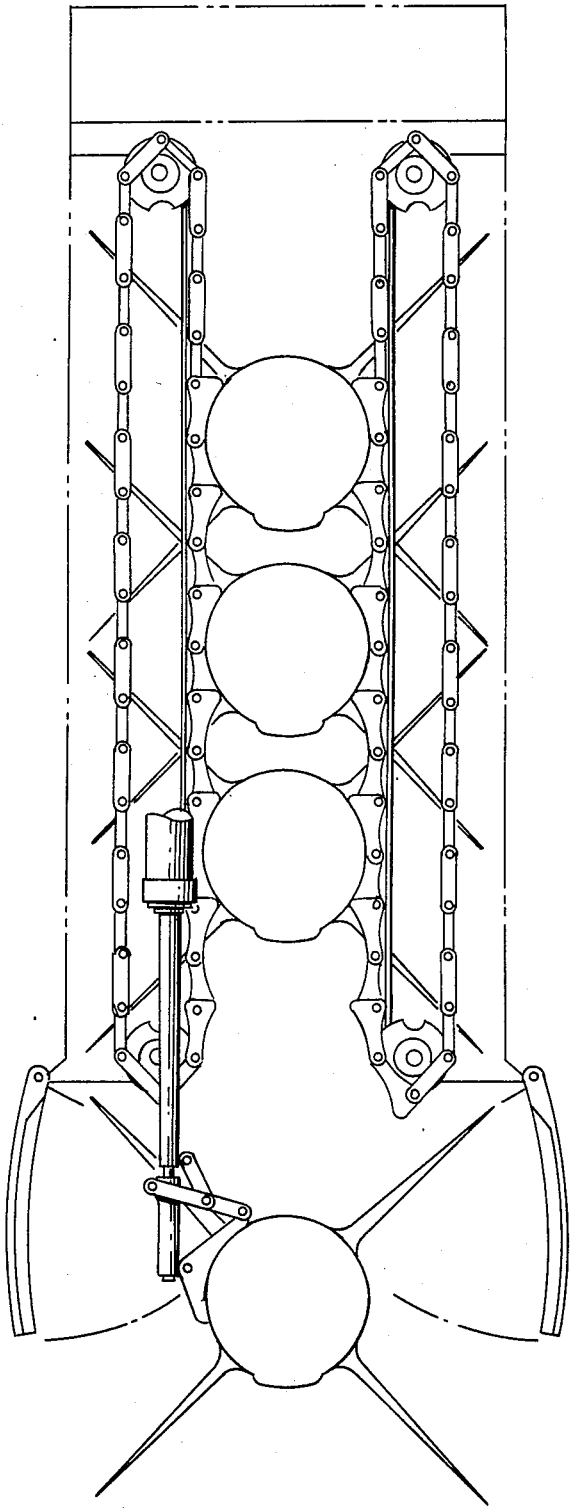
Fig. 4A
Fig. 4B

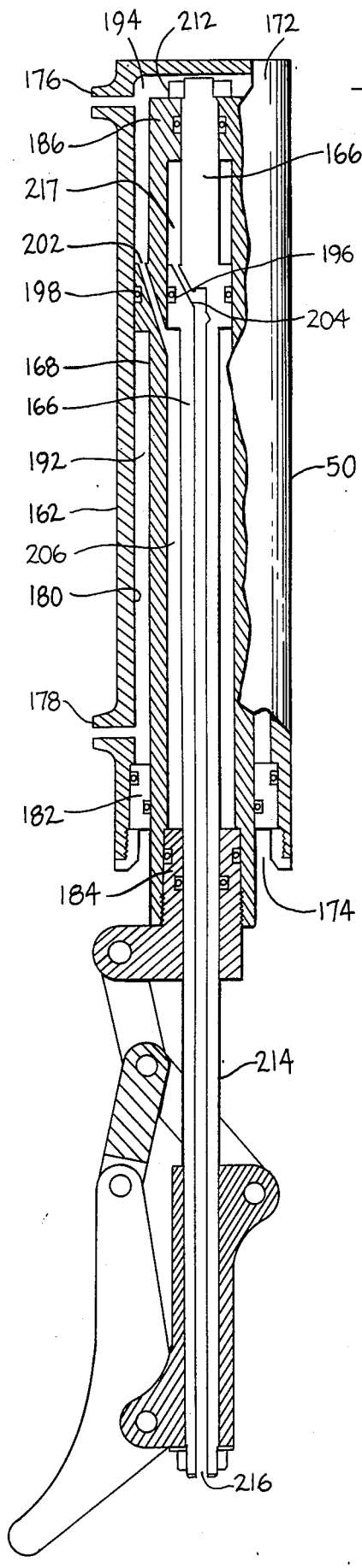
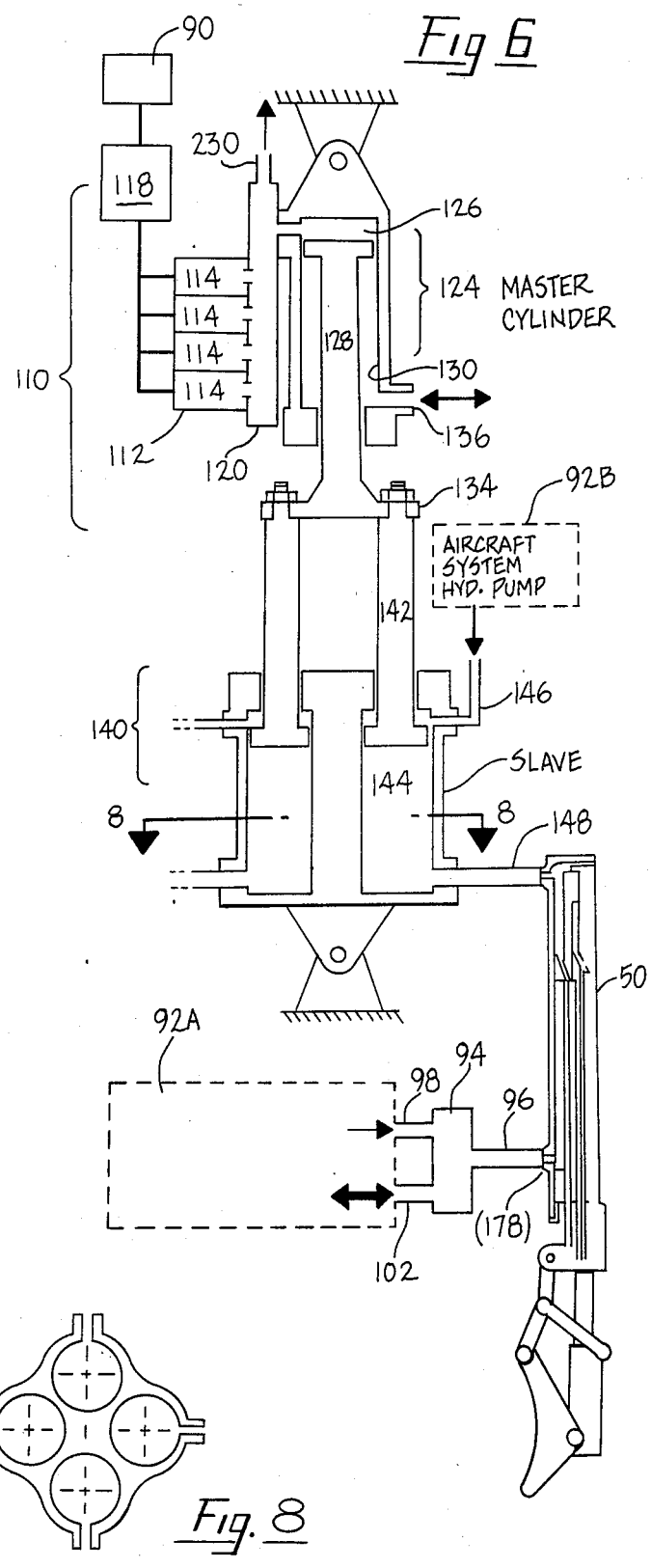
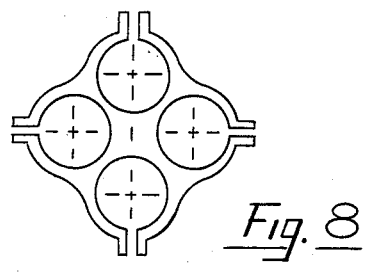
Fig. 7
Fig. 6
Fig. 8

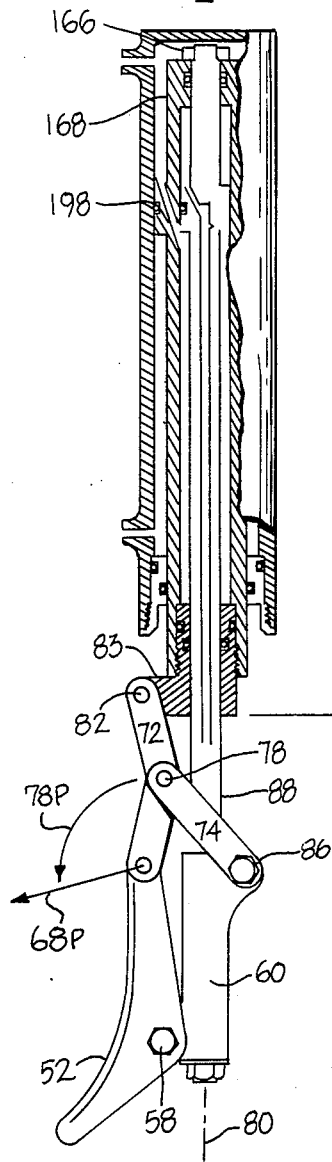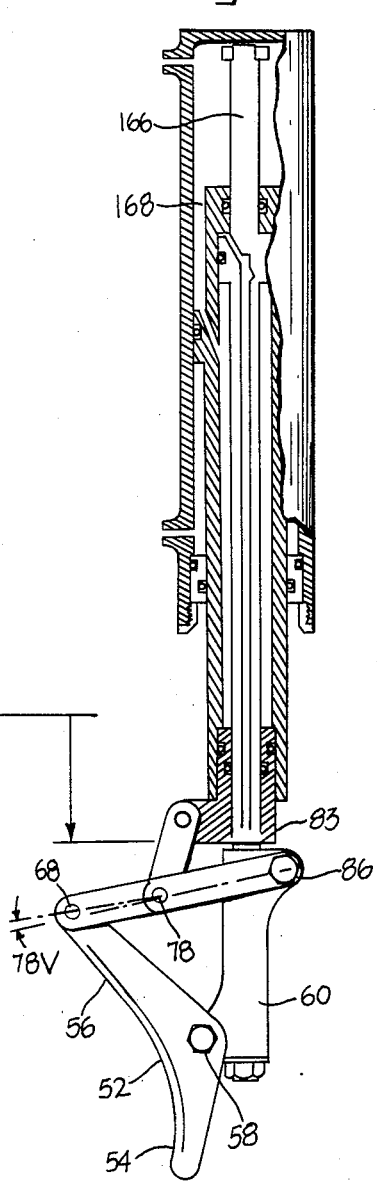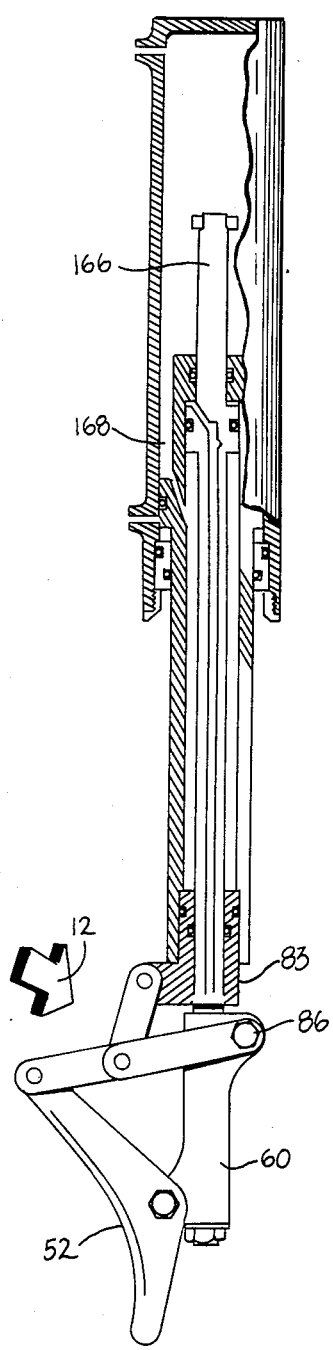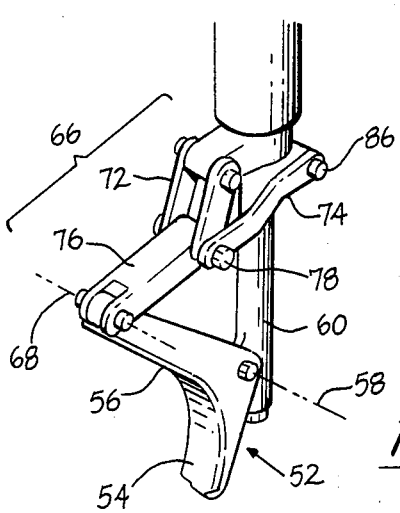

STORES MAGAZINE AND LAUNCH SYSTEM

BACKGROUND OF THE INVENTION

The present invention relates to a stores magazine and launch system for fighter or attack aircraft, and particularly to a compact, vertically configured system for loading, storing, and ejecting stores, such as missiles. More particularly, the invention provides a magazine and launch system for compact internal storage of missiles wholly within the aircraft eliminate the drag usually caused by external missile carriers. In addition to moving missiles into and ejecting them from an aircraft, the magazine stabilizes the missiles to reduce movement thereof during flight and ground maneuvers. The launcher includes power assisted missile loading, unloading, retention, and deployment system.

The terms weapon, store, and missile, as used herein, are used interchangeably. The term missile may refer to a particular class of store or weapon; however, all classes of ordnance and stores are also included within the term, which should be taken in the widest possible sense.

The magazine and launch system of the present invention is an improvement over previous methods of internal stores carriage, i.e. rotary systems. The volume required for rotary system internal storage precluded internal carriage, resulting in external carriage systems and reduced performance. In this arrangement, a given number of missiles of a given size and the missile handling system occupy a minimum of volume and can be stored internally of the aircraft.

Military aircraft are designed to transport stores or weapons, such as bombs, rockets or missiles, to a target area for release at the command of the pilot. A number of aircraft have external store carriers arranged to depend somewhat from the exterior of the aircraft. However, external carriers and the carried stores introduce considerable drag, degrading the flight and handling characteristics of the aircraft. It would be desirable for such fighter/attack type aircraft to have a plurality of stores available, without introducing drag or reducing aircraft maneuverability and without establishing a uniqe radar signature.

Previous attempts to provide for internal carriage of stores have not been adopted for smaller types of aircraft due to the dimensional requirements for acceptance of the rotary drum configuration launcher system or due to the reduced number of stores which may be carried.

U.S. Pat. No. 2,481,542 to G. L. Schyler discloses a store attaching and ejection mechanism mounted within an open store cavity provided in an aircraft fuselage or in a nacelle which is in turn mounted externally to the underside of an aircraft.

U.S. Pat. No. 2,599,555 to P. F. Hurt, describes a rocket magazine having rocket positioning pawls for holding rockets arranged in a substantially vertical orientation. The rockets are lowered to a firing cradle, which is oscillatable about a fixed axis to align rockets with a barrel through which the rockets are fired. However, the rocket carrier is inadequate for handling larger stores, such as missiles, which would likely be damaged if not maintained separate one from another, nor is there provision for positive ejection by the magazine, as distinct from the rocket itself.

U.S. Pat. No. 2,826,120 to Lang et al discloses a mechanism for mounting stores internally of an aircraft. This mechanism is of the known drum type which requires that the aircraft have substantial girth to accept a drum of a diameter sufficient to support the several stores. as shown particularly in FIG. 4 thereof.

SUMMARY OF THE INVENTION AND OBJECTS

In the present invention, an aircraft such as a small, high performance fighter is provided with an internal stores handling magazine. The store handling magazine includes an ejector system and is preferably integrated internally into the fuselage such that the aircraft is accorded maximum survivability and performance when compared with comparable aircraft capable of carrying stores externally.

The magazine system holds and positions stores for storage, loads and unloads stores, and, upon command, provides for ejection of each of a plurality of stores. Components of the magazine system stabilize and prevent movement of the stores within the aircraft. Further, the stores are completely enclosed within the envelope of the aircraft thereby eliminating air turbulence about the aircraft, as would be caused by external store mounts and stores carried thereon. Drag is not increased and unique radar signature problems are not introduced as are occasioned with external store attaching devices and externally carried stores.

The magazine and launch system of the present invention is applied to handling of ordinance stores or weapons, such as air-to-air or air-to-ground missiles, internal of an aircraft. The magazine system is configured as a vertically oriented missile transport system comprising powered chain carriers which move missiles vertically to and from storage and ejection positions and hold the missiles in position during flight. When the bottom missile is down-loaded to release position, it is stabilized in a pre-fire position by the carriers from above and by hands of an actuator/ejector mechanism from below. Also, the magazine carriers are used to onload and offload the missiles to and from the magazine.

The actuator system includes at least a pair of operated actuator devices. Each actuator device includes a missile or weapon handling means positionable into alternate positions. In one position of the actuator device, the handling means are conditioned to accept and retain a missile to be ejected. When the deployment and ejection sequence is initiated, the handling means is conditioned to a missile release position. Thereafter, the actuator device is powered to eject the missile from the aircraft. After completing the missile ejection sequence, the actuator device is retracted to repeat the cycle as the carrier mechanism positions another missile for deployment.

The vertically oriented store magazine includes at least a pair of powered flexible store carriers which hold the missiles apart and move them vertically as a unit. The carriers, in the form of chains driven by powered sprockets, have links with store engaging shoes shaped to engage the missiles to move the same, as well as to stabilize the missiles when stored prior to release thereof. When the bottom missile is loaded down to firing position, it is stabilized from above by the opposed shoes of the chain, and is supported underneath by hands of a launching actuator. The action of the magazine carriers and the launching mechanism is reversible to load missiles into the aircraft.

The missile launch actuator includes missile handling means which are positionable alternately to a missile retaining position or to ejection position. Thus, the launch actuator includes at least a pair of telescopically positioned, hydraulically operated arms, each having a hand multi-moveable between two positions. A master driver ensures simultaneous actuation of a plurality of secondary driver means, each operating a hand. Each secondary driver means is coupled hydraulically with the missile handling means to cause the latter to be displaced to a retracted position with the hands open upwardly. In this position, the hands accept a missile from the carrier, and retain the missile prior to deployment. When deployment is initiated, the first motion of the actuator positions the hands to enable release of the missile. The remaining stroke of the actuator pushes the missile from the aircraft to accomplish ejection. Thereafter, the actuator is retracted, and the arms and hands are returned to missile retaining position to be loaded with another missile by the carrier. The cycle is repeated until all missiles have been ejected. By reversal of certain steps of the cycle, missiles can be loaded abroad the aircraft.

The drive means for the hydraulically powered actuator mechanism include inner and outer pistons moveable relative to each other. These pistons are attached mechanically to the missile handling means to cause pivoting of the latter to and from a missile retention condition and a missile release condition upon relative piston movement. When the pistons move together, these pistons drive the missile handling means to and/or from the aircraft.

Accordingly, it is a general object of the present invention to provide a compact, substantially vertically oriented, stores magazine and launch system adapted to carry within the fuselage of an aircraft, and eject one or more stores, such as bombs or missiles, Another object is to provide a system of the above character including a stores magazine mechanism to positively support stores within an aircraft and to prevent relative movement between stores and the aircraft during ground operations and in flight.

Another object is to provide a system of the above character including a powered stores actuator mechanism to impart a controlled ejection to stores simultaneously with their release from an aircraft.

Another object of the present invention is to provide a system of the above character including a stores handling mechanism for retention and deployment of stores, components of the mechanism being actuated simultaneously through hydraulically operated systems.

Another object of the invention is to provide a system of the above character including a hydraulic control system for simultaneous actuation of several store handling means upon operation of a master driver means connected to the store handling means through secondary driver means.

Other objects and advantages of the present invention will become apparent from the following detailed description, when taken in connection with the accompanying drawings, of which:

BRIEF DESCRIPTION OF THE DRAWINGS

FIG. 4A is a sectional view similar to FIGS. 3 and 4 in which the actuator arms are withdrawn, ready to eject a store, out with the right actuator and arm omitted for clarity.

FIG. 4B is a sectional view similar to FIGS. 3 and 4, in which the lower most store is shown being ejected by the actuator arms, but with the right actuator and arm omitted for clarity.

FIG. 6 is a schematic representation of the complete control system and actuator of the system of the invention.

FIG. 7 is an enlarged elevational view partly in cross-section of the arm actuator with parts cut away and parts omitted for clarity.

FIG. 8 is a cross-sectional view of the secondary driver bank of the control system, taken along section line 8—8 of FIG. 6.

FIGS. 9–11 are elevational views showing the stages of operation of one ejector of the missile handling system in FIG. 1, shown: in retracted position for missile retention (FIG. 9); in partially actuated position for missile release (FIG. 10); and in extended position for missile ejection (FIG. 11).

FIG. 12 is a perspective view of an actuator hand for engaging a missile taken generally from FIG. 11, from the view of arrow 12.

DETAILED DESCRIPTION OF THE PREFERRED EMBODIMENT

The present invention enables a fighter/attack size aircraft to transport missiles internally while maintaining the integrity of a high performance envelope. Further, the missile handling mechanism facilitates loading, storing and deployment of the missiles, as well as relatively high density packing of the missiles so that a larger number of missiles may be enclosed in the aircraft than would be expected with known constructions. This very desirable missiles or other stores to a release site without the turbulence, additional drag, and radar cross-section which would result from carrying such missiles externally of the aircraft.

Figure 1:
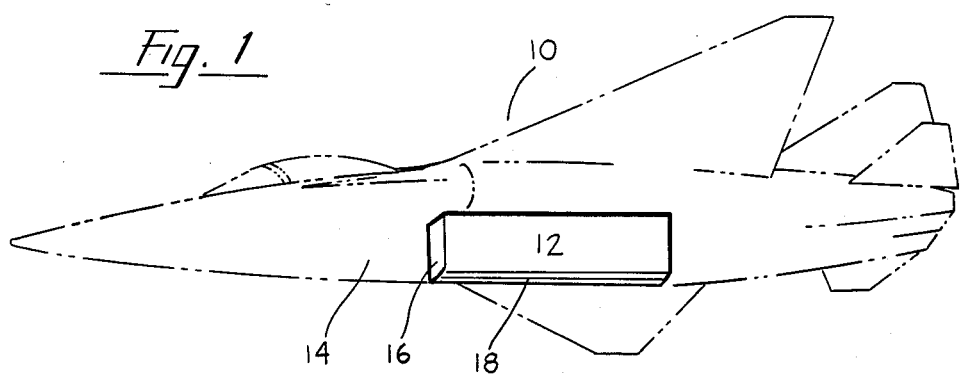
FIG. 1 is a schematic representation of an aircraft incorporating a store magazine and launcher system construction in accordance with the present invention.
Figure 2:
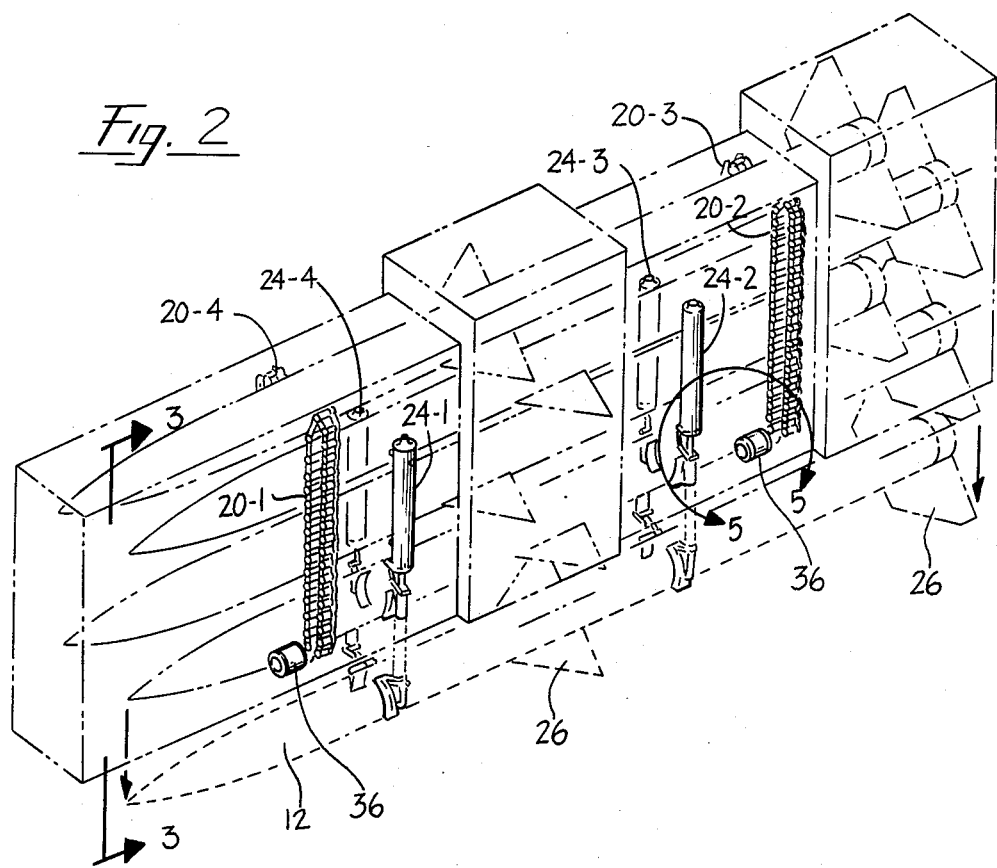
FIG. 2 is a perspective view of the magazine and launcher system of FIG. 1.

In FIGS. 1 and 2, an aircraft 10 is illustrated as carrying stores 12 such as bombs or missiles of cylindrical configuration. When loaded aboard the aircraft, the missiles 12 are carried internally within the fuselage 14 of the aircraft 10. Specifically, the missiles are enclosed in a walled chamber 16, isolated or removed from the pilot or other aircraft personnel to prevent decompression of the aircraft and/or the distractions caused by turbulence and airflow which will occur upon opening of access doors 18 to permit ejection of the missiles at the target area.

Illustrated in FIG. 2 are compact missile carrier mechanisms 20 and deployment or ejector mechanisms 24, together comprising the missile handling system. The carrier and ejector mechanisms are of slim profile, arranged vertically within the aircraft to support and stabilize missiles 12 during ground maneuvers and during flight of the aircraft to the missile deployment area. Further, the mechanisms provide for higher density packing of the missile such that the missiles are stored in a configuration that occupies a minimum volume, from a calculation of the volume required to store a missile 12 with fins 26. By loading and storage of the missiles 12 at predetermined forward/rearward staggered positions, fins 26 of adjacent missiles are misaligned relative to the fins of other missiles. Thus, a larger quantity of missiles may be carried in the aircraft than if space had to be maintained to preclude engagement of the fins or other external protrusions of one missile relative to the fins of adjacent missiles.

As shown in FIG. 2, four sets (20-1, 24-1; 20-2, 24-2; 20-3, 24-3; 20-4, 24-4) of the missile handling mechanisms 20, 24 are arranged in the aircraft to support the missiles at spaced locations near the heads and tail ends. The missile carrier and ejector mechanisms 20 and 24 do not restrict the configuration of the missile to a specific contour, but can handle missiles which may be contoured differently.

A pair of the missile carrier mechanisms 20 are positined proximate one another on opposing sides of the missiles to engage the same. Similarly, the relatively slim ejectors forming the ejector mechanism pairs 24 are positioned proximate one another on opposing sides of the missiles. These missile handling mechanisms facilitate movement of missiles into the aircraft, retention and stabilization of the missiles while aboard the aircraft, movement of missiles to release position, and eventual ejection of the missiles from the aircraft.

Figure 3:
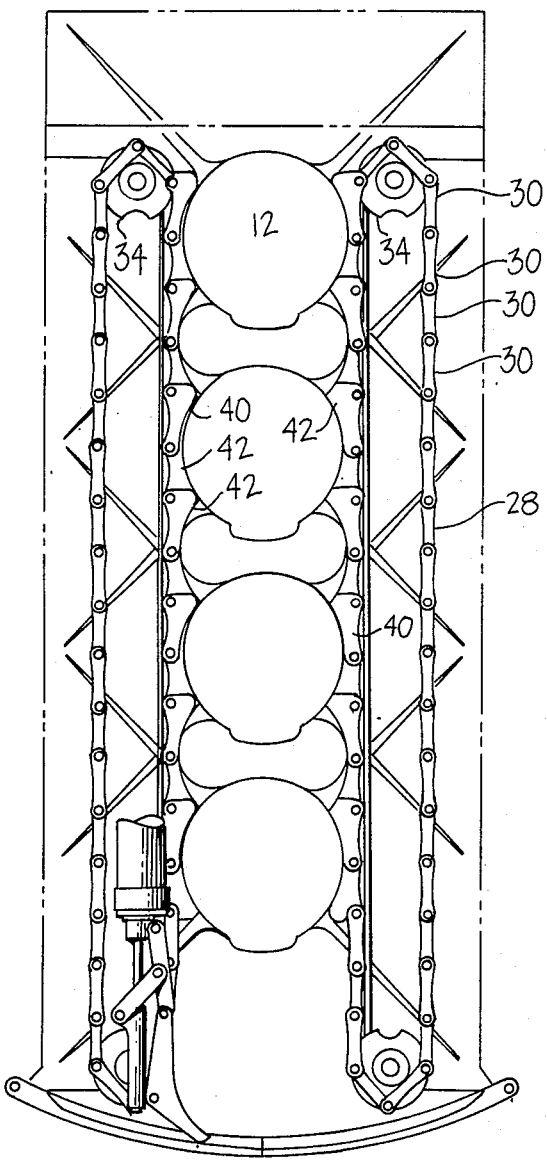
FIG. 3 is a cross-sectional view of the magazine taken along the line 3—3 of FIG. 2 showing stowed stores, and the access doors in the fuselage of an aircraft closed with the right actuator therein omitted for clarity.
Figure 4:
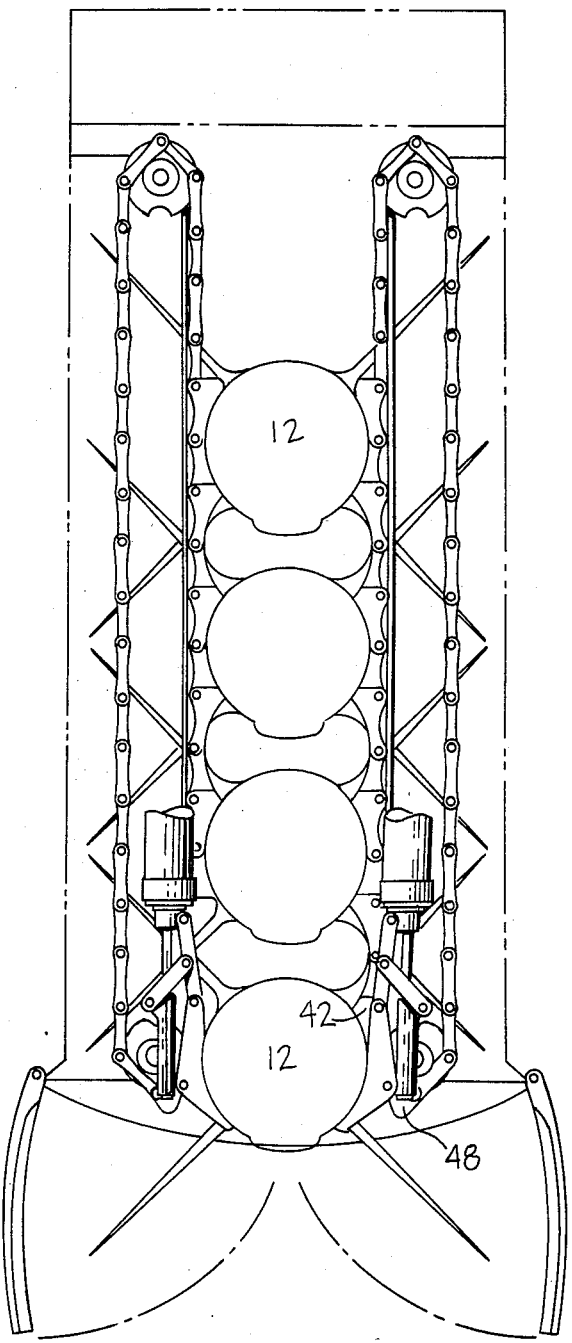
FIG. 4 is a cross-sectional view similar to FIG. 3 with the aircraft access doors open and a store lowered for release.

The magazine or carrier mechanisms 20, as shown in FIGS. 3 and 4, include at least two pair of transport chains 28 arranged substantially vertically within the fuselage 14 of the aircraft 10. In this preferred embodiment, each of the transport chains 28 are formed of a plurality of links 30, coupled to sprocket engaging pins 32 which pass about sprockets 34 spaced longitudinally a height as necessary to enable storage of a predetermined number of missiles 12. Some or all of the magazine drive sprockets 34 are powered by electric motors 36 (as shown in FIGS. 2 and 3) to synchronously drive the chains 28 to move the missiles 12 are required. Forming some of the chain links 30, and attached to adjacent sprocket engaging pins 32, missile positioning shoes 40 are configured with concave arcuate faces 42 to engage the missiles sufficiently to preclude vertical or longitudinal movement thereof. The orientation of the positioning shoes 40 on opposing sides of the missiles 12 precludes lateral movement of the missiles.

Figure 5:
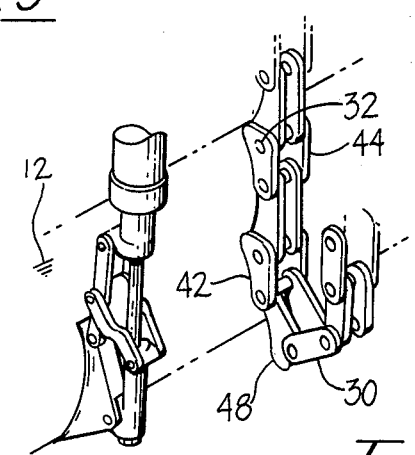
FIG. 5 is an enlarged perspective view of the missile carrier links taken within the line 5—5 of FIG. 3.
Figure 13:
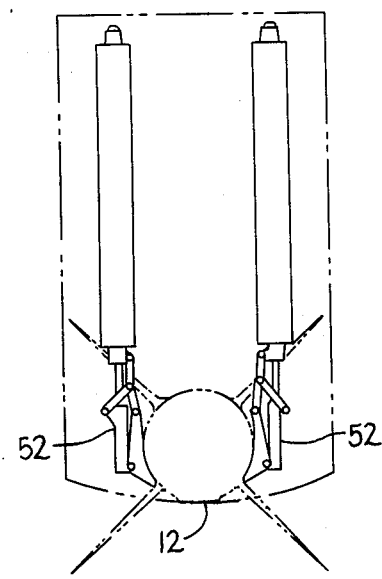
FIGS. 13–16 are elevational views of the missile actuator mechanism in the missile retention position (FIG. 13); in missile ejection position (FIG. 14); in missile ejected position (FIG. 15); and in retracted position after a missile is ejected from the aircraft (FIG. 16). The positions of FIGS. 13 and 16 correspond to FIG. 9, that of FIG. 14 to FIG. 10, and that of FIG. 15 to FIG. 11.

In this embodiment of the missile carrier, as shown in more detail in FIG. 5, the positioning shoes 40 are of divided construction, with a first portion 44 dimensioned to extend longitudinally of the chain 28 between adjacent link pins 32, and to engage an upper portion of a missile 12. A cooperating second portion 48 is similarly dimensioned to fit between adjacent link pins 32 of the chain 28, and to engage the lower portion of the missile. With the opposing positioners 40 carried by the opposing pairs of chains 28, and due to the multiple points of engagement of the missiles by the positioning shoe portions, movement of missiles relative to aircraft motion is substantially precluded. Thus, the aircraft, while loaded with missiles, may perform the maneuvers of which it is capable when not loaded.

The missile ejector mechanism 24, shown in detail in FIGS. 9–16, includes a pair of telescoping, hydraulically operated ejector actuators and arms 50, each supporting an arcuate hand 52. As shown in FIG. 12, the hands 52 are provided with missile engaging pad portions 54, 56 for holding, releasing, and ejecting a missile 12. These hands 52 are pivotally displaceable positively about an axis 58, which extends transversely of a support body 60 attached to one end of ejector 50. In response to displacing action of portions of the ejector 50, as shown from FIGS. 9 and 10, a linkage 66 connecting the hand to another portion of ejector 50 through an axle 68 forming an axis passing through the upper end of the hand causes the hand 52 to pivot between open and closed positions. In one position (FIG. 9), the hand 52, is pivoted up so that lower pad portion 54 is arranged at least partially beneath a missile 12 to prevent dropping movement of the missile from the aircraft. In the position (FIG. 10), the upper pad portion of the hand is moved over the missile to enable the pad portion to engage an upper surface of the missile to eject the same from the aircraft. That is, the hands 52 are displaceable from a missile loading and holding, or closed, condition (FIG. 9) to a missile release and ejecting, or open, condition (FIGS. 10 and 11).

A tri-lever linkage 66 controls movement of the hand 52 between the open and closed conditions, by pivoting of selected components of the linkage 66 by independently displaceable members of the ejector 50. The linkage 66 is comprised of three lever members 72, 74 and 76. One end of each lever member is connected to an axle 78 defining an axis movable along a path $78p$, transversely of an axis 80, which extends along the length of the ejector 50. The end of first lever member 72, remote from axle 78, is connected at pivot 82 to sleeve 84 displaceable along ejector driven by an axially movable portion of the ejector 50. The end of the second lever member 74, remote from the axle 78, is connected to the support body 60 for arcuate movement about a pivot 86. The third lever member 76 is connected, at its end remote from axis 78, to the hand 52 by a pivot 68. By axial displacement of portions of the ejector 50 along axis 80, the linkage 66 pivots the missile engaging member or hand 52 on the support body 60 about axis 58 in response to actuation of the tri-lever linkage 66.

As seen in FIGS. 9–12, the lever members of linkage 66 move through different paths responsive to displacement of portions of the ejector 50. As shown in FIG. 9, axle 78 swings arcuately along path $78p$ as the lever member 74 is moved about axle 86. As axle 78 moves, the axis 68 by which lever member 76 joins the hand 52, moves along path $68p$. These movements are occasioned when the sleeve 83 moves along axis 80, and displaces lever member 72 along a substantially straight path, traced as the axle 78 follows path $78p$. As shown particularly in FIG. 10, the axle 78 moves beyond alignment between axis 86 and axis 68 to a slightly overcenter position by a distance $78v$. While the linkage 66 is in this condition, hand 52 is unable to pivot from the open position, as conceivably might occur during deployment of a missile from the aircraft.

Schematically, as shown in FIG. 6, the missile ejectors 50 are hydraulically driven in unison from a master driver 124. The master driver is powered by explosive gas generators 114 which are ignited on command from control system 90. The hydraulic components interface with on-aircraft hdyraulic system 92. Aircraft hydraulic pressure is provided to ports 98 and 146 and return pressure is provided to port 102.

The ejector valve 94 is connected to each ejector 50 at port 96. Prior the ejection sequence the valve is positioned to allow hydraulic return flow from the ejector as it displaces fluid. After the missile is ejected the valve is then positioned to provide aircraft system pressure in order to retract the hand and reset the master driver. The ejector valve is commanded by control system 90.

A gas generation system 110 provides a first source of energy to initiate operation of the hydraulic system, in response to the control system 90. The energy is supplied from each of a plurality of gas generator cartridges 112 retained in cartridge chamber 114. The cartridge are activated selectively by a cartridge ignition system 118, connected to the control system 90. A master valve 120 connects each cartridge chamber to the ejectors sytem so that upon ignition of a cartridge 112, gas from that cartridge is released into the master valve, which opens the selected cartridge chamber to permit expansion of the gas. As the gas expands, the master valve ports the gas to a master driver 124. The gas is fed into a chamber side 126 of the master driver with a sufficient pressure and at a rate to cause movement of a piston 128 within a cylinder 130 of the master driver 124.

After the energy of the gas has been expended during displacement of the piston in the master cylinder, the master valve opens the port 230 to permit exhausting of the gas from the master cylinder. As each missile is positioned for deployment, a new gas generator cartidge is readied to initiate the first step in the sequence of operations of the master driver 124. The gas charge causes the ejector system to be initiated substantially instantaneously, without requiring that the aircraft hydraulic system have an unduly large capacity or have an excessively high pressure to have the capability of desired performance.

During ground operations, the aircraft is loaded with a number of gas generator cartridges at least corresponding to the number of missiles loaded aboard the aircraft.

The master driver 124 functions effectively to ensure that all missile ejectors, shown as four, move in unison during their operational sequence, including the ejection stroke. By the design as set forth herein, the master driver controls the hydraulic supply to each of the ejectors simultaneously and identically to maintain missile stability and control.

The cylinder 124 of the master driver functions to control displacement of the piston 128 therein, as gas under pressure from the gas generator system 110 is injected into an expansion chamber side 126 of the cylinder 130, against the head side of that piston. The side of the cylinder 130, opposite the head of piston 122, is connected to a vent 136 to enable gas or fluid in the cylinder to be exhausted at ambient or low pressure. By the presence of the vent 136, no significant pressure is present to restrain movement of the piston 128. Further, by the venting of the gas from the expansion chamber 126, minimum pressure is required to reverse the direction of movement of the piston.

A driver plate 134 forms a part of the piston 128 in the driver cylinder 130. To this driver plate is attached fixedly a bank of secondary drivers 140, arranged respectively to transmit energy to an ejector mechanism 50. Each secondary driver 140 is connected to the driver plate 134 by a piston 142 enclosed substantially in a cylinder 144. The cylinder 144 of each secondary driver is dimensioned to a volume substantially equivalent to the volume displaced in ejector 50. Each secondary driver cylinder displaces equal volumes to each ejector 50. The driver plate 134 mechanically links all four secondary drivers, such that the motion of the master driver piston 128 causes equal volumes from each secondary driver to displace into each ejector 50 and all four ejectors move in unison.

The ejector, as shown in FIG. 7, includes a housing 162 substantially enclosing an inner piston 166 and an outer piston 168. The pistons 166, 168 are dimensioned and the fluid pressures selected as required to actuate the pistons to selected conditions, to operate the linkage 66, and to withstand the loads caused by the anticipated weight of the missiles, as well as forces air flow and turbulence, tending to cause extension of the pistons when in other than fully extended conditions. Typically, the fluid pressure must be sufficient to maintain the pistons retracted when the missiles are loaded in the hands 52, and awaiting deployment. Particularly, the differential pressures must be adequate to cause the inner piston 166 to remain retracted while the outer piston 168 extends to lock the ejector hand 52 of the ejector into missile release condition. Similarly, the outer piston 168 must be capable of being retracted to operate the ejector hand 52 while the inner piston 166 remains retracted to offset the load tending to cause extension thereof. Likewise, during the ejection stroke, the same pressure and force conditions must be available to cause controlled movement of both the inner piston 166 and the outer piston 168.

The ejector system housing 162 is essentially sealed at the internal end 172, and is open at the opposite end 174 for relative telescoping movement therethrough of the pistons 166 and 168. The respective movements of these pistons are controlled by the input and exhausting of hydraulic fluid through an extend port 176, and the exhausting and input of the fluid through a retract port 178.

Associated with the inner wall 180 of the housing 162 near the open end thereof is a seal stop and bushing 182 through which the outer piston 168 passes. Forming the inner end of the outer piston 168 is a combination bushing and stop seal 184 in which the inner piston 166 is movable. On the outer end of piston 168 is an aligning bearing and seal 186 through which the outer end of the inner piston 166 is movable. In addition to maintaining alignment of the elongated axially movable pistons, these elements 182, 186 form seals to chambers 192, 194 in which the operating fluid is retained in the housing 162.

Another bearing seal 196 is positioned external of the inner piston 166, and displaced from the inner end thereof. Also, this bearing seal forms a stop to limit the extent of outward movement of the outer piston 168 relative to the inner piston 166.

A corresponding aligning seal and stop 198 is arranged externally and intermediate the end of the outer piston 168. This stop permits extension of this outer piston from the housing 162 until this seal stop 198 engages a surface of the seal stop and bushing 182 on the inner surface of the ejector housing 162.

The external seal 198 on the outer piston 168 and the external seal 196 of the inner piston 166 are both bypassed with ports to permit passage fluid around these seals. Specifically, a port 202 is formed in the seal 198 of the outer piston 166 to permit passage of fluid from the upper chamber 194 into an inner chamber 206, intermediate the interior surface of the outer piston 168 and the exterior surface of the inner piston 166. This port 202 is configured and arranged to direct to the chamber 206 a portion of the fluid from chamber 194 upon inputting of fluid through the extend port 176. The chamber 217, to the outer side of the inner piston 166, is vented to ambient pressure through port 204 so as to not generate resistance to movement upon actuation of the components, and upon extension and/or retraction of the pistons relative to the ejector housing 162. Fluid through internal crossports 202 of the piston 186 is available to force the pistons as required to preclude inadvertent movement of the pistons due to the weight of the missile.

The ejection cycle begins with the extension of piston 168. As the secondary driver forces high pressure fluid into the extend port 176, chamber 194 fills while chamber 192 exhausts through port 178 to aircraft hydraulic return pressure. Flow from chamber 194 through port 202 fills chamber 206 and provides the necessary pressure to retain inner piston 166 in the retracted position, as gas in chamber 217 is vented through port 204 to ambient pressure at the end of piston 166 at vent hole 216.

Inner piston 166 remains retracted until the stop seal 186 on outer piston 168 engages the stop seal 196 on inner piston 168. The initial motion of the outer piston 168 relative to the inner piston 166 drives the linkage 66 to the missile release condition, from which it cannot be back-driven due to the overcenter 78v of links 74 and 76. The initial extension sequence is shown in FIGS. 9 and 10.

The ejection cycle is completed with the extension of outer piston 168 and inner piston 166 relative to the ejector housing 162. As additional fluid from chamber 144 of the secondary driver flows into the extend port 176, chamber 194 continues to fill while chamber 192 exhausts. The inner and outer pistons move together until the stop seal 198 on outer piston 168 engages the seal bushing 182 near the open end of housing 162. The ejection sequence is completed as shown in FIG. 11.

The ejector is retracted hydraulically with the aid of aircraft hydraulic pressure. The retraction movement is initiated by positioning the ejector valve 94 such that aircraft system hydraulic pressure is ported to the retract port 178 on the ejector, and the master valve 120 is positioned to allow exhaust through port 230 of the gas within cylinder 126 such that minimum resistance to movement is encountered. As fluid flows into chamber 192 the ejector pistons 168 and 166 move toward the closed end 172 of housing 162. The fluid displaced through port 176 into the secondary driver chamber 144 drives the secondary and master driver back to the starting position. The relative motion between inner piston 166 and outer piston 168 unlocks the linkage 66 and returns the hand 52 to the open condition. The retraction sequence is essentially the reverse of the ejection sequence with the exception that aircraft hydraulic power rather than gas-driven master driver means is used to accomplish retraction.

The ejector mechanism 50 is designed to have sufficient structural integrity, for use with an adequate supply of hydraulic pressure, to resist loads due to both missile weight and air generated turbulence. To maintain the ejector retracted, both the inner piston 166 and outer piston 168 are capable of retracting to and resisting external loads tending to cause extension thereof. During the initial ejection motion when only the outer piston 168 moves, the inner piston 166 remains retracted and the outer piston 168 extends to actuate the linkage 66 and to lock the ejector hand 52 into missile retaining, pre-deployment holding position.

The initial conditions of the ejector system 50 in which a missile 12 is loaded to firing position includes having another ejector valve conditioned to provide aircraft hydraulic fluid under pressure to a retract port 146 of the bank of secondary cylinders. Similarly pressure is available at the retract port 96 which is used to drive the secondary cylinders back to firing position. At this condition, the master cylinder valve is positioned to exhaust gas and/or fluid from the cylinder chamber venting side of the piston head through vent port 230.

When the missile is ready for launch, control 90 is actuated by a crew member of the aircraft. Such a control activates a gas generator cartridge 112 and positions the ejector valve 94 to allow flow from the retract port 178 of the ejector mechanism 50. Simultaneously, the master cylinder valve is positioned to close the exhaust port such that gas from the gas cartridge 112, upon ignition, can expand only into the master cylinder expansion chamber. Momentarily thereafter, one gas generator cartridge is electrically ignited. Gas from the cartridge expands into the master cylinder 124 to initiate drive of the pistons of the master and secondary drivers. The secondary driver pistons, aided by hydraulic fluid pressure from port 146, force hydraulic fluid into the ejector mechanism 50. In turn, the other ejector valve portion opens to permit pistons of the ejector mechanism to force hydraulic fluid from lower chamber 192 along a return system into a reservoir or accumulator of the aircraft hydraulic system.

As shown in FIGS. 9-12, the hand 52 is supported on the ejector mechanism 50 for movement by the linkage 66 in response to the hydraulically powered, dual action pistons of the ejector mechanism 50. The outer piston 168 of the ejector mechanism is extendable from a first position (FIG. 9) to a second position (FIG. 10), and thereafter to a third position (FIG. 11). The extension and/or retraction of this outer piston displaces lever 72 to move the linkage 66, causing pivoting of the hand 52 about hinge 58 to alternative open and closed conditions. This hinge 58, proximate the end of the carrier 60, connects the hand 52 to the carrier near the lower or outer end of the hand.

During the preparation for missile ejection, the hand is opened as the inner piston 166 is moved relative to the outer piston 168. Although the head remains in place, the piston 168 is forced from the fully retracted condition to a partially retracted condition causing the linkage 66 to pivot the hand 52 from closed to open orientation. This occurs as the link member 72 connected to the sleeve 84 drives the adjacent ends of the link members 74 and 76 to a semi-locked over-center condition. In such a condition, the lever members 74 abd 76 maintain spacing of the upper portion of hand 52 away from the axis 80 along the ejector mechanism 50. In this condition, the hand is restrained against movement and cannot inadvertently return to a closed or partially closed orientation. Thus, a missile 12, after being positioned, is positively ejected from the aircraft.

During the release or deployment step of the missile ejection sequence, the outer piston 168 is actuated to the telescoped or extended condition. The linkage 66 is displaced further to position the "heel" of the hand 52 to engage the missile 12 to move the same until adequately clear of the aircraft 10. During this portion of the ejection sequence, the missile propulsion system is fired or energized for flight of the missile toward a target.

As seen in FIGS. 13–16, the components forming the ejector mechanism 50 are seen to operate in pairs to handle a missile 12. In the first position. The launching mechanism is arranged in missile loaded, ready-for-firing position. The hands 52 are pivoted into closed orientation with the lower ends thereof sufficiently close to retain the missile against further displacement. That is, the hands 52 partially encase the bottom of the missile and thereby retain the same against further vertical displacement. The weight of the missile 12 keeps the same in position between the hands.

Figure 14:
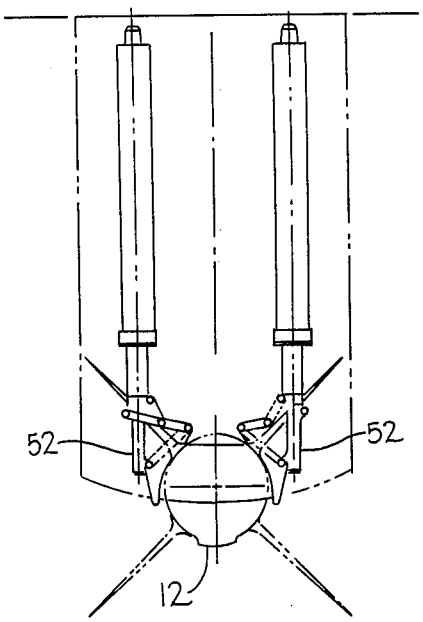
Figure 15:
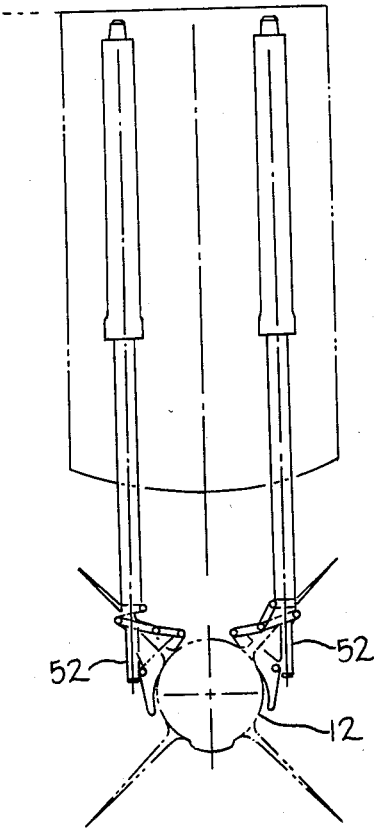
Figure 16:
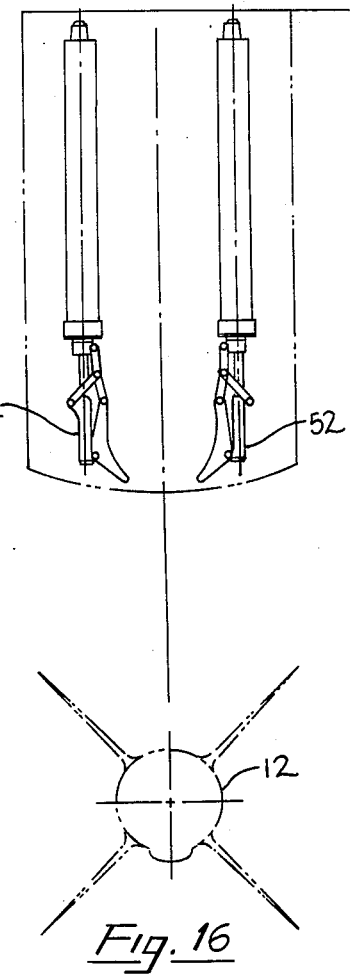

Subsequently, as seen in FIG. 14, the first outward axial or telescoping motion of each of the mechanisms moves the hands 52 from their closed missile retention positions to the missile release open condition. The missile is retained temporarily on the carrier unit the second outward motion of the ejector mechanism (FIG. 15) moves further downwardly to deploy the missile from the aircraft with the hands maintained open. Thereafter, the hands are returned to their closed positions followed by retraction of the pistons to receive another missile.

If other missiles are available, the carrier 20 will be powered to position the next missile into the hands forming the cradle. Thereafter, the now cradled missile can be ejected.

When the aircraft returns to its supply station, the missile handling assembly is used to load missiles 12 into the fuselage 14 of the aircraft 10. Following positioning of a missile beneath the aircraft, the hands 52 are actuated to open orientation, and positioned proximate the missile. The hands are actuated to their closed orientation to cradle the missile, which then is lifted into the aircraft. After the missile is in the aircraft and proximate the operating zone of the carrier 20, the carrier removes the missile from the cradle formed by the hands. The loading cycle is repeated until the capacity of the aircraft is reached. Thereafter, the missile handling mechanism is prepared for storage of the missiles until such time as the missiles are to be released.

Since other variations and modifications with the spirit of the invention may occur to those skilled in the art, the invention may be practiced other than as specifically described with respect to the preferred embodiment, but within the scpoe of the appended claims.

What is claimed is:

1. A stores handling system for an aircraft having a fuselage including a chamber for enclosing the stores handling system proximate an area openable through said fuselage through which stores may be loaded into and ejected from the aircraft, the handling system comprising a magazine arranged substantially vertically within the chamber for storing and positioning ejectable stores and including flexible drive means having stores holding means spaced apart thereon for engaging and retaining stores against movement within the aircraft, and for lifting and/or lowering stores within the chamber; and a launching mechanism for receiving stores individually from said magazine means, and including actuator means having stores positioner portions for engaging and controllably ejecting stores through the openable area of the fuselage of the aircraft.

2. A handling system as in claim 1 wherein said actuator means include hands of arcuate configuration pivotable between alternate first and second positions, one portion of said hands engaging weapons to preclude ejecting movement of a weapon when said hands are in said first position, and another portion of said hands engaging a weapon to eject same from the aircraft, when said hands are in said second position.

3. A stores handling system for an aircraft as in claim 1 wherein said actuator means of said launching mechanism include hands pivotable to alternate positions for engaging said stores to preclude ejecting movement when said hands are in a first position, and for engaging said stores to eject same from the aircraft when said hands are in a second position.

4. A handling system as in claim 3 wherein said actuator means include telescopically positionable piston means to extend and retract alternatively positionable weapon engaging hands relative to the fuselage of the aircraft.

5. A handling system as in claim 4 wherein said actuator means include linkage means interconnecting said engaging hands and said piston means to displace said hands to a stores retaining position upon retraction of said piston means, and to a stores release position upon extension of said piston means.

6. A handling system as in claim 4 wherein said actuator means include alternately positionable engaging hands connected by tri-lever linkage means to said piston means for displacing said hands to a retaining closed position upon retraction of said piston means, and to a stores release opened position upon extension of said piston means.

7. A handling system as in claim 4 wherein said actuator means include a master driver means having a hydraulically powered movable component;

at least two secondary driver means fixed to said master driver movable component for simultaneous movement to control a hydraulically operated system;

an actuator mechanism powered by each secondary driver hydraulic system for displacing piston means to position said hands.

8. A missile magazine and launching system for handling missiles in an aircraft having a fuselage including a chamber for enclosing said magazine and launching means proximate an area openable through said fuselage through which missiles may be loaded into and ejected from the aircraft comprising magazine means, arranged in opposition with the chamber for positioning and holding missiles, having flexible drive means with missile engaging positioners thereon for retaining missiles against movement within the aircraft, and for lifting and/or lowering missiles substantially vertically within the chamber of the aircraft; and launching means for receiving missiles from said magazine means including actuator means having missile positioner portions for engaging said missiles for controlled ejection of said missiles from the aircraft, and missile handling means pivotable to alternate positions to partially cradle a missile when in a first position, and to release the missile for ejection by said actuator means through the openable area in the fuselage of the aircraft when in a second position.

9. A missile magazine and launching system as in claim 8 wherein said missile handling means of said launching means include:
hands of arcuate configuration having two portions, the hand being pivotable between alternate first and second positions, one portion of each said hand engaging the missiles to preclude ejection movement of a missile when said hands are in said first position, and another portion of each said hand engaging the missile to cause ejection of same from the aircraft, when said hands are in said second position.

10. A system as in claim 8 wherein said missile handling means of said launching means include
alternately positionable missile engaging hands connected for simultaneous displacement to missile retaining position and to missile release position,
each missile engaging hand having a first portion to engage a lower surface of a missile when in said missile retaining position, and a second portion to engage an upper surface said missile when said hand is in said missile release position.

11. A system as in claim 8 wherein said missile handling means of said launching means include
alternately positionable missile engaging hands connected for simultaneous displacement to missile retaining position and to missile release position,
each missile engaging hand being configured arcuately with missile engaging portions defining opposing ends thereof, the missile engaging portion on one end engaging at least a lower surface of a missile when in missile retaining position, and the missile engaging portion on the other end engaging at least an upper surface of a missile when in said missile release position.

12. A system as in claim 8 wherein said means of said magazine and launching means include:
said magazine means including opposed flexible means for oppositely engaging missiles and retaining said missiles therebetween,
said flexible means being displaceable about guides arranged vertically one above another whereby missiles positioned between said flexible means in said magazine means are aligned substantially one above another.

13. A system as in claim 12 wherein said missile handling means of said launching means include:
missile actuator means cooperating with said magazine means, and being oriented substantially vertically in alignment with the openable area of the fuselage of the aircraft to displace a missile from the magazine through the fuselage for deployment of the missile.

14. The system as in claim 1 in which said actuator means includes
a master driver means having a hydraulically powered movable component,
at least two secondary driver means fixed to said master driver movable component for simultaneous movement to control a hydraulically operated system,
an actuator mechanism powered by each secondary driver hydraulic system for displacing piston means to position weapon handling means.

15. The system as in claim 14 wherein said secondary driver means and said ejector have respective cylinder capacity volumes dimensioned to be substantially equal.

16. The system as in claim 14 further in which said master driver means and said secondary driver means include means for enabling rapid actuator mechanism displacement by said hydraulic supply, and for enabling retention of said actuator mechanism by controlling porting of fluid from another hydraulic source whereby similar components of each of said actuator mechanisms are caused to be relatively displaced simultaneously responsive to initial actuation by said master driver means.

17. The system as in claim 14 further including a hydraulic source other control of said master driver means to control fluid from another hydraulic source to actuate simultaneously said pistons of said actuator mechanisms whereby said weapon handling means of said actuator mechanisms are displaced simultaneously to weapon retention position to and weapon deployment position upon relative movement of the pistons of said actuator mechanism.

18. A system as in claim 17 wherein an inner piston means of said actuator mechanism drives said missile handling means axially of said cylinder, and an outer piston of said actuator mechanism is coupled to said missile handling means and drives same relative to said inner piston means to cause movement of said handling means from a first position to a second position upon relative movement of said inner and outer piston means.

19. The system as in claim 1 in which said actuator means includes
a master driver means comprising a cylinder having a hydraulically powered piston movable therein,
at least two secondary driver means fixed to said master driver movable component for simultaneous movement upon displacement of said master driver piston,
an actuator mechanism coupled hydraulically to each secondary driver means for displacement,
said actuator mechanism including a cylinder, and a pair of pistons slideable in said cylinder.

20. A system as in claim 19 wherein said master driver means is a cylinder and piston mechanism operable by gas generator means which upon ignition displace the piston from a first position to a second position.

21. A system as in claim 20 wherein a piston of each of said plurality of secondary driver means is fixed to said master driver means for movement simultaneously therewith.

22. A missile handling system as in claim 21 further including means for hydraulically coupling each said actuator mechanism to said secondary driver means, and a hydraulic system for selectively actuating of components of actuator mechanism independently of the hydraulic system of said master driver means and said secondary driver means to cause positioning of said missile handling means between a missile retaining position and a missile deploying position.

23. A system as in claim 19 wherein said actuator mechanism includes a missile handling means mechanically to said relatively displaceable first and second piston means wherein said handling means is displaceable axially of said cylinder upon simultaneous movement of said piston means, and is displaceable about an axis transverse to said piston means axis upon relative displacement of said piston means.

24. A system as in claim 23 wherein said piston means are crossported to enable hydraulic fluid to actuate said second piston means responsive to displacement of said first piston means.

* * * * *